United States Patent [19]
Chidester

[11] Patent Number: 5,946,469
[45] Date of Patent: Aug. 31, 1999

[54] COMPUTER SYSTEM HAVING A CONTROLLER WHICH EMULATES A PERIPHERAL DEVICE DURING INITIALIZATION

[75] Inventor: Philip Dale Chidester, Austin, Tex.

[73] Assignee: Dell Computer Corporation, Round Rock, Tex.

[21] Appl. No.: 08/559,753

[22] Filed: Nov. 15, 1995

[51] Int. Cl.⁶ ................................................. H01H 13/70
[52] U.S. Cl. .................... 395/500; 395/653; 395/750.06; 395/892; 345/157
[58] Field of Search ..................... 395/500, 900, 395/200.09, 893, 800, 750, 750.06, 653, 892; 364/234, 234.2, 273.1, 280, 280.2, DIG. 1; 345/157, 163

[56] References Cited

U.S. PATENT DOCUMENTS

| | | | |
|---|---|---|---|
| 4,484,266 | 11/1984 | Becker et al. | 364/200 |
| 4,603,385 | 7/1986 | Mueller et al. | 364/200 |
| 4,718,064 | 1/1988 | Edwards et al. | 371/20 |
| 4,727,477 | 2/1988 | Gavril | 364/200 |
| 4,823,302 | 4/1989 | Christopher | 364/900 |
| 5,034,598 | 7/1991 | Poland | 235/435 |
| 5,101,498 | 3/1992 | Ehlig et al. | 395/800 |
| 5,138,706 | 8/1992 | Melo et al. | 395/500 |
| 5,214,785 | 5/1993 | Fairweather | 395/800 |
| 5,237,692 | 8/1993 | Raasch et al. | 395/725 |
| 5,289,580 | 2/1994 | Latif et al. | 395/275 |
| 5,437,024 | 7/1995 | French | 395/600 |
| 5,444,849 | 8/1995 | Farrand et al. | 395/200.09 |
| 5,485,614 | 1/1996 | Kocis et al. | 395/500 |
| 5,499,378 | 3/1996 | McNeil, Jr. et al. | 395/500 |
| 5,608,895 | 3/1997 | Lee | 395/500 |
| 5,611,048 | 3/1997 | Jacobs et al. | 395/200.09 |
| 5,642,110 | 6/1997 | Raasch et al. | 341/26 |
| 5,652,890 | 7/1997 | Foster et al. | 395/750 |

*Primary Examiner*—Kevin J. Teska
*Assistant Examiner*—Thai Phan
*Attorney, Agent, or Firm*—Pennie & Edmonds LLP

[57] ABSTRACT

A computer having a peripheral device emulator capable of emulating peripheral devices, thereby allowing a mouse to be physically connected to the computer system and function normally despite not being initialized at the time of system startup or reset. The peripheral device emulator, implemented in the computer system's keyboard controller, operates in conjunction with a password lock mode and also operates at the time of system startup or reset. The peripheral device emulator accepts commands, status requests, and other control signals directed from the CPU and responds appropriately. Initialization commands sent from the CPU are stored for transfer to the emulated peripheral device when the device is physically connected to the computer system.

3 Claims, 1 Drawing Sheet

COMPUTER SYSTEM HAVING A CONTROLLER WHICH EMULATES A PERIPHERAL DEVICE DURING INITIALIZATION

BACKGROUND OF THE INVENTION

The present invention relates to computer systems (particularly small computer systems), and methods of operating computer systems. Typically, when power is turned on or the computer is reset, the computer will recognize attached peripheral devices and operate them correctly as long as the computer and the devices are properly configured. After the computer system is booted it enters a normal operating mode. Unfortunately, if another peripheral device, a mouse for example, is connected to the computer after the computer is in a normal operating mode (i.e., it has been booted), it will not operate correctly. The present invention solves this problem by emulating a peripheral device, such as a mouse or digitizing pad, in the computer's keyboard controller.

To better understand the present invention, the following paragraphs provide some technological background.

A. Handling Keyboard Inputs

One of the basic choices in an interactive computer architecture is how to detect and respond to user inputs on the computer.

1. Evolution of the Industry-Standard Architecture

In the original IBM PC, the keyboard was located in a separate housing the system chassis, and was connected to the chassis by a cable with a standard interface definition (which was changed in the transition from XT to AT). The keyboard housing was powered, through its cable, from the system chassis. The keyboard housing include a separate microprocessor which was used to constantly monitor user keystrokes, and this processor relayed keystroke events to the CPU microprocessor through an interrupt-driven architecture. See generally Norton, "Inside the PC Keyboard," PC WORLD vol. 1, no.4, pp. 190–197 (1983), which is hereby incorporated by reference; Mefford, "An in-depth exploration of the PC keyboard and its interrupt service routines," MICROSOFT SYSTEMS JOURNAL vol. 5, no. 3 (May 1990) at p. 22, which is hereby incorporated by reference.

In this architecture, the keyboard microprocessor monitors the individual keystrokes to detect any changes of state (i.e. the user presses or releases any key). Whenever a keystroke is detected, the keyboard microprocessor sends a high-priority interrupt to the CPU. When the CPU services this interrupt, it retrieves the key event code from the keyboard microprocessor, translates it to determine appropriate character and/or status codes, and loads this information into a software buffer. The application software can then read this software buffer, in due course, as needed. This can be done by a software interrupt, or by a direct read to the address of the area reserved for the keyboard buffer.

This architecture has generally been-retained through numerous stages of evolution of the industry-standard architecture (ISA).

In the industry-standard architecture, the keyboard microprocessor has generally been an Intel 8048, but several related chips have also been used. See Levine, "Keyboard Mfrs. Scramble for Microcontroller," ELECTRONIC NEWS vol. 30, no. 1482, p. 50 (Jan. 30, 1984), which is hereby incorporated by reference. Other chips used have included the 8748 (which includes EPROM), the 8031 (ROM-less), the 8051 (mask-programmed), and the 8042 (the original keyboard controller whose interface is emulated by the more recent chips).

2. Recent Changes

The most significant departures from this keyboard interface architecture have occurred very recently. In laptop and smaller computers, the keyboard is often integrated into the same chassis as the CPU. Moreover, the low-power needs of such computers have forced reconsideration of architectural blocks such as the keyboard.

Thus, more recent hardware architectures have begun to handle keystroke inputs in a slightly different way. If the keyboard microprocessor is located in the system chassis, then the simple keystroke-monitoring functions can be combined with other functions too.

3. Keyboards vs. Pointing Devices

For any graphical user interface, a simple keyboard is an inadequate channel for user input: a user also needs some very rapid way to select a point from the two-dimensional display space.

A variety of pointing devices have been used in computer interfaces, including mice, touchpads, trackballs, joysticks, light pens, and touch-sensitive screens. All of these devices work well on the desktop where power and space are not major concerns. They do not work as well when used with a portable computer.

B. System Startup

1. Startup Software (POST, Bootstrap, etc.)

A computer system normally includes a number of complex hardware components (chips and subsystems). When power is first applied to a computer (or when the user triggers a reset), the various hardware elements (chips and subsystems) will each have their own internal procedures (reset procedures) to regain a stable and known state. However, at some point (if the hardware is intact), these reset procedures will have ended, and at this point the CPU performs various important overhead tasks under software control. These overhead tasks include, for example, performing sanity checks on system hardware, issuing diagnostic signals (such as sounding beeps through a speaker or turning on LEDs), and permitting the user to branch into an NVRAM configuration program. This phase of operation is generally referred to as "POST" (Power-On-Self-Test). During POST the CPU determines the configuration of the computer system, thereby identifying the peripheral devices that are attached.

After POST, a "bootstrap" program is run, to permit the CPU to begin execution of other software. For robustness, the POST and bootstrap software is normally stored in read-only memory. The bootstrap program prompts the CPU's execution of the primary operating system software; the primary operating system software can then be used to launch an application program, either-manually or automatically. Depending on how the system has been set up, the boot software may direct program execution into DOS, UNIX, OS/2, or another operating system. This is normally automatic and predetermined, but is manually user-selectable in some systems. However, the choice of operating system is not particularly relevant to the inventions described in the present application.

2. Bootstrap Programs

Every computer system must have some way to begin program execution after a cold start (when the system is turned on). The hardware architecture of a microprocessor (or other CPU) will normally provide for a "reset" operation, which places all of the hardware circuits in a known electrical state; but it is still necessary to start the CPU's execution of a desired program. For example, in the very early days of computing, some computer systems would be manually configured to read in a "bootstrap loader" program at startup. This bootstrap program was a simple program that loaded in, and started execution of, another sequence of instructions which were the beginning of the desired program. Bootstrap programs are often referred to simply as "boot" software.

As a more recent example, Intel 80×86 microprocessors, after a hardware reset, attempt to begin program execution from a specific memory address. That is, the microprocessor will read, and attempt to execute as a microprocessor instruction, the contents of that memory location. The specific memory location used by the 80×86 family is xxxFFFF0h, i.e., 16 bits below the top of the memory space. Other microprocessors may use a different starting address, but similar principles apply. If a branch instruction is found at this address, program execution continues at whatever address the microprocessor is instructed to branch to.

Thus, this initial target address is the entry point for every session of use. This address is normally used to start programs that must be run every time the computer is used.

3. "Basic Input/Output System" Software (BIOS)

In many types of modern personal computers (and in all "IBM-compatible" personal computers), a key part of the system software is a "basic input/output system" (BIOS) program. The BIOS program contains frequently-used routines for interrupt handling, for interfacing the CPU with key peripherals, such as a keyboard, and so forth. The term "peripheral," "peripheral device," or "peripheral component" normally refers to those components of a computer system that are not on the motherboard, i.e., which must be addressed through a system bus or through an external port. However, the usage of this term is somewhat variable; sometimes it is used to refer to any I/O device, or only to refer to components which are optional add-ons. The BIOS software provides some degree of machine-independence. However, this independence is not always fully exploited by the available commercial software. Many programs bypass the BIOS software and directly access the underlying hardware addresses or devices. See Glass, "The IBM PC BIOS," *Byte*, April 1989, pp. 303ff.

For system robustness, the BIOS software itself is normally packaged in non-volatile memory with other key pieces of overhead software, such as POST, boot, and configuration management routines, as well as a pointer to launch the computer into the operating system software. However, in 1991 IBM introduced-a PS/2 system in which the BIOS is at least partially stored on disk. Packaging the BIOS, POST and boot routines in ROM makes a very robust firmware system. Short of hardware damage, it is very difficult for a user to distort the system to the point where it will not start up and run (assuming the operating system software is present). However, this system also provides a considerable degree of flexibility. As the operating system starts up (after the POST and boot routines), the user can remap address pointers to direct BIOS calls away from the standard BIOS routines. (It is also common to map out the entire BIOS code into fast RAM, for greater speed.) Thus, the term "BIOS" is often used more broadly, to refer to the entire collection of basic system routines in ROM or EPROM.

C. Software

1. Operating System Software

The application software will normally interface to an operating system (such as DOS, DOS+Windows, OS/2, UNIX, etc.). The operating system is a background software program which provides an application programming interface (API) for use by the application software. Some operating systems run continuously, or at least start up at regular intervals, even while an application program is running; other operating systems merely provide capabilities that can be invoked by the application software. Thus, the programmers writing application software can write their software to fit the API, rather than having to cater to the peculiarities of a particular machine. See Quedens, "Windows virtual machine." *PC Tech Journal* vol.5, no.10, pp. 90, 92–3, 95, 97, 99–100, 102 (October 1987), which is hereby incorporated by reference.

2. Device Driver Software

A device driver is a lower-level of operating system software. Typically a device driver interfaces to the actual peripheral hardware components, and provides routines that application software can invoke in order to access hardware components. Thus, the application software can simply make a call to an installed software subroutine, instead of having to find the specifications of each peripheral device and branch accordingly, whenever a peripheral I/O operation is needed. This permits application software to ignore the detailed specifications of peripheral hardware.

Normally, device driver software must contain a description of each target hardware platform. Thus, the software must be revised repeatedly, for reasons which are beyond the control of the companies making peripherals.

In personal computers, installable device drivers were first introduced in DOS 2.0. The role of device drivers has since been expanded, in subsequently introduced operating systems.

In particular, OS/2 provided expanded support for device drivers, including a library of "DevHlp" routines which can be called by device drivers. See generally Duncan, "An examination of the DevHlp API (writing OS-2 bimodal device drivers)," 3 *Microsoft Systems Journal* no.2 (March 1988) at 39; Schmitt, "Designing drivers for OS/2: I," *PC Tech Journal* vol.5, no.12, p. 164 (1987); and Schmitt, "Designing drivers for OS/2: II," *PC Tech Journal* vol.6, no.2, pp.136–155 (February 1988), all of which are hereby incorporated by reference.

3. Application Software

From a system designer's point of view, the application software is, subject only to the minimal constraints of the architectural standards, wholly unpredictable. Common applications include spreadsheets, word processors and publishing programs, databases, games, project managers and a wide variety of others. Inevitably, though, users will also run customized applications and new types of applications.

D. Portable Computers

1. Laptop and Smaller Computers

Portable personal computers were introduced in the early 1980s, and have proven to be very useful and popular. As this market has developed, it has become increasingly clear that users strongly desire systems to have small volume, small weight, physical durability, and long battery-powered lifetime. Thus, small portable computers ("laptop" computers) have proven extremely popular during the late 1980s. Users continue to demand more features, longer time between recharges, and lower weight and volume. This combination of demands is difficult to meet. Moreover, a smaller generation of portable computers, referred to as "subnotebook" computers, is increasingly popular. The smaller form factor will only exacerbate the difficulty of the above tradeoffs.

2. Some Difficulties of Small Size

To meet the weight, volume, and power budgets of small portable computers, much effort has been made, within the limits of acceptable compromise of user comfort and convenience, to re-engineer familiar components to attain the needed portability. For example, almost no laptop or notebook computers have more than two disk drives (typically one floppy drive and one hard drive); the keyboards are smaller than is optimal for touch typists; and the displays are smaller than on common desktop models.

Where such compromises are needed to attain the overriding goal of portability, users readily accept them. However, these compromises must be avoided where possible. Thus, for example, many users will "dock" their laptop or notebook computers, when on their desktops, in order to use better peripherals (faster, larger, more rugged, and/or easier to use) than could be carried with early portable computers.

Portable computers are inherently more susceptible than desktop computers to accident, loss, and theft. Thus, if critical work is being done on a portable computer, backup is even more of a necessity than with a desktop computer.

The quantities of mass storage available on portables have steadily increased, but the cost per byte of the necessary ruggedized drives continues to exceed that of the drives normally used in desktop systems. This disparity seems likely to continue. Similarly, although some small portables use non-volatile solid-state memory to replace disk drives, the cost per byte of such memory is likely to continue to exceed that of conventional mass storage devices.

Laptops normally have a severely limited set of external ports. This limitation is imposed by several factors: first, each external connector takes up precious surface area. Second, each external connector is a point of vulnerability to electrostatic-discharge-induced component failure. Third, each external connector is a possible point of entry for dirt and moisture. Fourth, the possible power required by all connectors must be considered, in calculating the worst-case power budget for a system.

Similar problems arise from the need for bus extension. Internal space is not available for expansion cards, as in a normal personal computer; but expansion needs still exist. Some small computers have brought out key bus lines into an external connector, but of course this is unwieldy. Other small computers have distributed signals through a port to an independently-powered extension bus controller with bus slots that emulate the computer's internal bus.

3. Continuing Advantages of Stationary Personal Computers

The capabilities and cost of both stationary and portable computers have rapidly improved over the years. However, it is likely that stationary personal computers will always have some advantages over lightweight portables: it has always been true that, for a given price, stationary computers have more computing horsepower, larger mass storage, better displays, and better user interfaces (including keyboard, mouse, joystick and/or track ball input devices). These advantages are due to the necessary constraints (of weight, volume, power budget, shock-resistance, and environmental resistance) which necessarily must be met by a small portable computer, and need not be met by a stationary personal computer.

4. Use of Both a Portable and a Stationary Computer

As small portable computers become ever more common, an increasing number of users prefer to use two computers: one for their desktop, and one more for the road. This increasingly common pattern of usage is very convenient for users, but also generates some problems.

One problem that arises is loss of file coherency: a user who edits a file on a secondary machine must transfer that file back to the primary machine before editing the same file on the primary machine.

5. "Docking" a Portable Computer

Users find it very convenient to "dock" a portable computer to a full-size keyboard and/or display. When a portable computer is used in such a configuration, users will also wish to use many of the peripherals (such as printer, modem, fax machine, tape backup devices, or additional disk drives) which are typically available with a desktop computer. This desire becomes more urgent as useful amounts of computing power become more available in portable computers.

Thus, in general, as convenient as small portable computers are, there is some difficulty getting data into and out of them. Often, the only data routes available between a portable and a desktop computer are via a modem or a floppy drive. This has been recognized as a problem, and many vendors have offered external drive connections for small portable computers. Some portable computers have Local Area Network (LAN) interface cards installed, but this is an expensive option and obviously requires access to a compatible LAN.

E. Existing Problems

1. Device Initialization

Problems still exist, despite the enormous improvements made in the field of small computer systems. One problem is that when a small computer'system boots or is reset, the system attempts to perform all initialization (of peripheral devices) at that time. For example, in the popular operating environment known as Windows, a mouse (or other pointing device serving the same functions) must be physically connected at the time Windows initially loads and executes. If the mouse is not connected at that time, it will not operate properly even if connected at a later time.

2. Password Lock—Protecting a Computer System

Password lock mode is used to protect a computer from unauthorized use. During this mode the CPU may still communicate with peripheral devices. However, unsolicited data, data requests, and other signals sent from one or more selectable peripheral devices are not accepted. If one of the selected peripheral devices, such as a mouse, is not connected to a computer while it is in password lock mode, it cannot be initialized and therefore will not operate correctly even after a normal operating mode is resumed.

One situation in which the password lock mode is helpful is with a network server. Because a network server is vital to the operation of a network, it is preferable to prevent unauthorized users from accessing the server while it is performing network functions. A password lock mode can be implemented on the network server to disable the server's keyboard and thereby prevent unauthorized persons from disrupting network operations. In this situation the keyboard controller will still function, in order to transmit signals to the CPU when a user enters the correct password to exit from password lock mode.

SUMMARY OF THE INVENTION

The present invention provides a method for handling a computer's peripheral devices when in a password lock mode and at system boot or reset. More particularly, this invention allows a microprocessor, such as a keyboard controller, to emulate peripheral devices. The invention can be added to most computer systems by making only one alteration to the system design—modification of the keyboard controller microcode.

One scenario in which emulation of peripheral devices will be advantageous is when a computer system is booted or reset and no mouse or other peripheral device is physically attached to the computer. It is known in the art that such a device must be connected to the computer when the computer attempts to initialize it. If not connected to the computer system before initialization is attempted, a peripheral device connected at a later time to the computer will not operate properly. This invention allows the peripheral device to be emulated during system boot or reset. In doing so, initialization commands and other signals, such as status requests, are intercepted by the device emulator. The device emulator will respond appropriately to such signals if necessary. When a peripheral device is connected later, the emulator will initialize it, thereby allowing it to function normally (i.e., as if it had been connected to the computer prior to initialization).

In another scenario, the present invention is implemented in conjunction with a computer's password lock mode. In the password lock mode, a computer will not accept unsolicited data, data requests, or other signals from one or more peripheral devices until a user inputs a correct password.

The presently preferred embodiment provides a small computer architecture in which the CPU can receive multiple kinds of interrupt signals, including signals from various peripheral devices. The CPU can also send numerous data messages, status requests, commands, etc., to the various peripheral devices. The keyboard controller will emulate specified peripheral devices and accept and store in memory any commands issued to initialize the devices. When the device is available, the controller issues, if necessary, the stored initialization commands to the device.

This invention allows, for example, emulation of a peripheral device such as a mouse or other pointing device, at system startup or reset. If a mouse is not actually attached during such an event, this invention emulates one, thereby allowing a mouse to be connected after startup and still work properly, thus solving a long-standing problem within the field of this invention. In this case the keyboard controller issues the appropriate initialization commands to the mouse after the mouse is attached to the computer system.

One significant feature of this device emulator is that it can be made completely invisible to the application software. Another feature of the present invention is that a simple keyboard key combination can toggle the computer system into or out of emulation mode. The peripheral emulation mode can also be entered by going into the BIOS setup. Different computer systems use various ways of going into the BIOS setup.

A further feature of the present invention is that it can be configured in a variety of manners. The emulator can be set to either emulate peripheral devices immediately upon system boot/reset, or to allow normal initialization of the computer system without invoking emulation. The computer may also default to the emulation mode all the time. In addition, the emulator can be configured to emulate some peripheral devices but not emulate some others.

Figure 1:
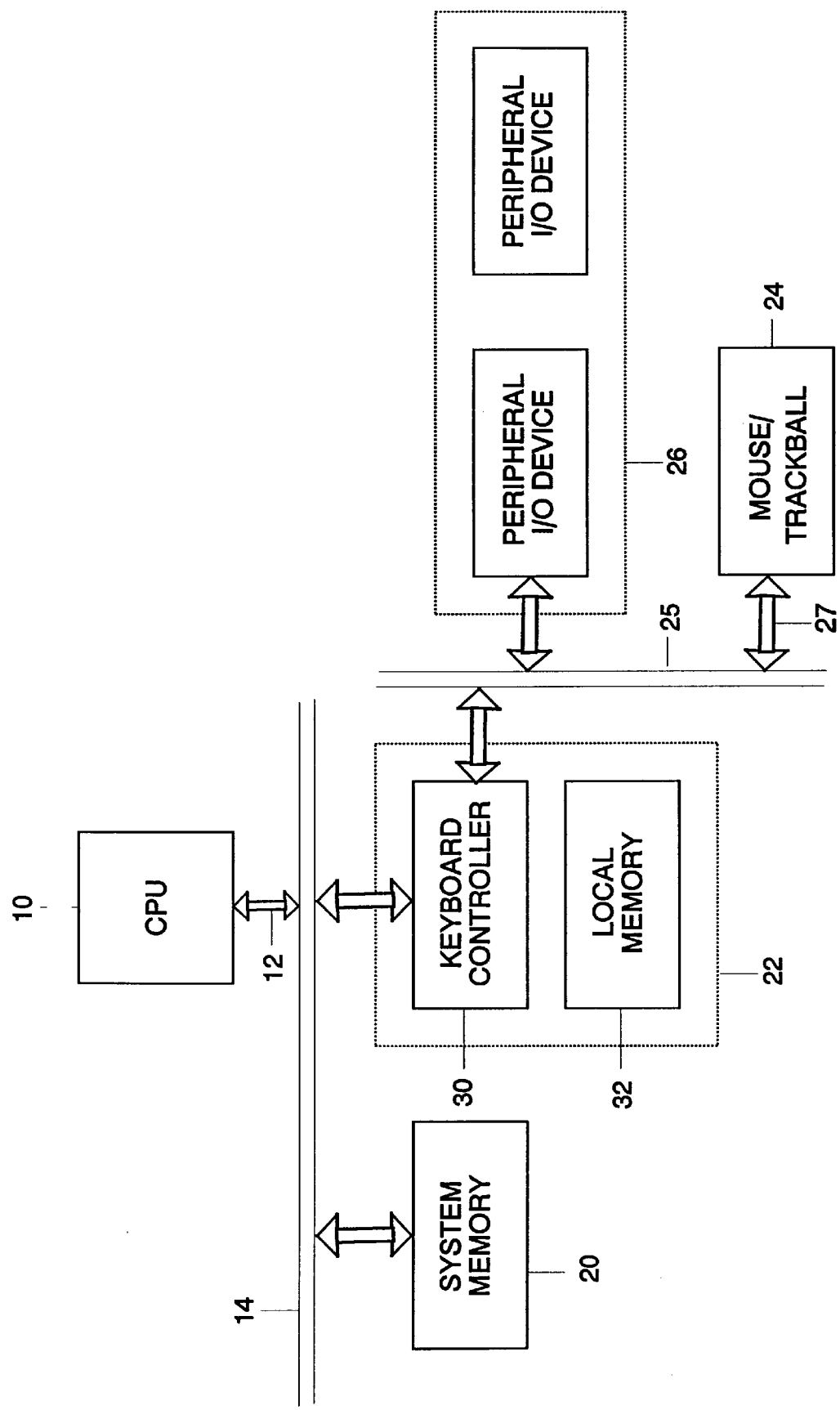
FIG. 1 provides a schematic diagram of a computer system, illustrating the components involved in the use of this invention.

DESCRIPTION OF PREFERRED
EMBODIMENTS

The teachings of the present invention will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

A computer system that may implement the present invention is illustrated in FIG. 1. The system includes a CPU 10 connected via a local bus 12 to a system bus 14. The CPU 10 communicates with the keyboard controller 30 and the system memory 20 via the system bus 14. Various peripheral input/output devices, such as a keyboard, mouse/trackball 24, communicate with the keyboard controller 30 via a second bus 25 (see FIG. 1).

CPU 10 may be an Intel Pentium microprocessor, some other member of the 80x86 family of microprocessors, a member of the Motorola 68020 processor family, or some other type of microprocessor. Keyboard controller 30 may be an 8051SL or 8042 controller. In general, peripheral devices may include video display devices, disk drives, modems, scanners, or other means of providing user interaction with the computer system, and they are typically connected to the system bus 14. Peripheral input/output devices 26 include a keyboard, mouse, trackball or wireless trackball and they are connected to the second bus 25. In FIG. 1, the mouse 24 may, alternatively, be some other pointing device such as a trackball, touchpad, light pen, etc.

A sample embodiment of this invention is implemented as follows. A computer system operates in two modes: normal mode and peripheral-emulation mode. A computer operating in normal mode operates identically to the way it would operate without this invention. The normal mode of operation includes a well-known condition called a password lock state wherein the computer system requires a correct password to be input before the computer will accept unsolicited signals from one or more selectable peripheral devices.

When operating in peripheral-emulation mode, at least one of the computer's peripheral devices 26, in the preferred embodiment a mouse 24, is emulated by keyboard controller 30. When emulated by keyboard controller 30, mouse 24 cannot communicate with CPU 10 because CPU 10 recognizes keyboard controller 30 as substituting for mouse 24. While in peripheral-emulation mode, keyboard controller 30 will accept all initialization commands directed toward mouse 24. These commands are preferably stored in the local keyboard controller memory 32 and are forwarded to mouse 24 when keyboard controller 30 ceases to emulate mouse 24 or when mouse 24 is physically connected to the computer system.

It is envisioned that keyboard controller 30 may also accept other, non-initialization, commands and messages, such as status requests, polling messages, etc. When such non-initialization messages are received, keyboard controller 30 may also store such messages. Under this invention, keyboard controller 30 will respond appropriately to messages and/or commands that are directed to an emulated device.

It will be recognized by one of ordinary skill in the art that a peripheral device 26 need not even be physically present or connected to the computer system in order for this invention to emulate the device.

Peripheral-emulation mode is engaged primarily in two circumstances. The first is when the computer system is in a password lock state, and the second is at system boot. Operation of the present invention under both circumstances is explained in the following paragraphs.

The invention may be configured such that when the computer system enters a password lock state, keyboard controller 30 automatically enters peripheral-emulation mode. Conversely, the invention may be configured such that when keyboard controller 30 enters peripheral-emulation mode, the computer system automatically enters a password lock state. As an additional option, the invention may allow peripheral-emulation mode to be engaged independently of a computer's password lock status. In the latter two alternatives, a chosen sequence of keys must be depressed on keyboard 22 to place keyboard controller 30 into peripheral-emulation mode. One such possible sequence of keys is FUNCTION+M or <CTRL>+<ALT>+M. A person of ordinary skill in the art will recognize that numerous different key sequences will suffice and that the invention may be configured to allow different key sequences to perform different functions.

A second circumstance under which keyboard controller 30 enters peripheral-emulation mode is when the computer system boots or resets. As described above, when the computer system boots it loads several software routines, initializes hardware devices, etc. The system boot, or CPU boot, may be a cold boot or a warm re-boot. In a cold boot the system is switched from a power-off condition to a power-on condition. In a warm re-boot, the system is already on, but is being reset, usually through a button or switch on the computer case or the familiar IBM-compatible key sequence of <CTRL>+<ALT>+<DELETE>.

This invention will preferably be configured to emulate at least one peripheral device 26 at system boot, particularly if device 26 is not connected to the computer at boot time. In this manner, keyboard controller 30 substitutes for peripheral device 26 by accepting the computer's initialization commands and responding appropriately. The actual device 26 can then be attached to the computer system some time after the computer system is booted. At such time, the invention will initialize device 26 with commands substantially identical to those which keyboard controller 30 received at system boot or reset while emulating peripheral device 26. Keyboard controller 30 may then cease emulation of device 26.

It is specifically envisioned that this invention will be applied to the known problem wherein a mouse 24 or other pointing device, if not connected to the computer system and initialized at system startup, cannot later be physically connected and function properly while the machine is functioning in the normal mode. In this preferred embodiment, at system startup the computer system will automatically execute the programming code that implements this invention. In one embodiment the program code for this invention will be included as part of the BIOS routines. When executed, this program code will examine the computer system to determine whether mouse 24 or other pointing device is physically connected and capable of being initialized. If no pointing device is detected, this invention will invoke peripheral-emulation mode for either a specified or generic pointing device, preferably a mouse.

A person of ordinary skill in the art will recognize that implementation of this invention may require some portion of system memory 20, in addition to or in place of, local keyboard controller memory 32, be reserved for storage of commands or other signals directed at an emulated peripheral device.

Although the above descriptions of the present invention are directed toward peripheral devices that are physically connected to the computer system, it is envisioned that the invention is equally applicable to devices that communicate with the computer system without a direct physical connection (e.g., devices communicating with the computer via an infrared communication link or via a network).

Software Implementation Details

Following is a sample specific implementation of software portions of the disclosed innovations. This example is intended to illustrate the disclosed innovations, and to comply with the best-mode requirements of U.S. patent law. This specific implementation is subject to change and can be altered, as will be apparent to those skilled in the art, in many details. The following code portions provide the most relevant portions of the code used, but of course these code portions are used in combination with large additional portions of code.

```
;****************************************************
;The following code virtualizes an external mouse
; If there is no external mouse it sends back replies to
;the main CPU as if an external mouse were connected
;****************************************************
;
;Command D4 - Send byte to AUX device (external mouse)
;****************************************************
spd_D4:   cjne    R6,#0D4hjspd_BX      ;send byte to AUX device
          mov     a,bMISCFLG
          jnb     acc.bitKEYBOM,no_int_mousey
          jmp     keybomouse
no_int_mousey:
          jmp     real_mouse
jspd_BX:
          jmp     spd_BX
keybomouse:
;****************************************************
;Command EC- Reset mouse wrap mode
;****************************************************
          cjne    R7,40ECh, ckmack
          jmp     nomack
ckmack:
;****************************************************
;Command FF - Reset mouse - virtualize
;****************************************************
          cjne    R7,#0ffh,mack
          mov     a,#0fah
          call    send_motopc
          mov     a,#0aah
          call    send_motopc           ;SEND bat TO PC
          mov     a,#00h
          call    send_motopc           ;SEND id TO PC
          jmp     nomack
mack:
          mov     a,#0fah
          call    send_motopc
;****************************************************
;Command E9 - Mouse Status request - virtualize
;****************************************************
          cjne    R7,#0e9h, ckmeb
          mov     a,#64h
          call    send_motopc           ;SEND id TO PC
          mov     a,#00h
          call    send_motopc           ;SEND id TO PC
          mov     a,#20h
          call    send_motopc           ;SEND id TO PC
          jmp     nomack
;****************************************************
;Command EB - Read mouse data - virtualize
;****************************************************
ckmeb:
          cjne    R7,#0ebh,ckmee
          mov     a,#00h
          call    send_motopc           ;SEND id TO PC
          mov     a,#00h
          call    send_motopc           ;SEND id TO PC
          mov     a,#00h
          call    send_motopc           ;SEND id TO PC
          jmp     nomack
;****************************************************
;Command EE - Set mouse wrap mode - virtualize
;****************************************************
```

```
ckmee:
        cjne    R7,#0eeh, ckmf2
        jmp     nomack
;*************************************************
;Command F2 - Read mouse device type - virtualize
;*************************************************
ckmf2:
        cjne    R7,#0f2h, ckmfe
        mov     a,#00h
        call    send_motopc             ;SEND id TO PC
        jmp     nomack
;*************************************************
;Command FE - Resend mouse data - virtualize
;*************************************************
ckmfe:
        cjne    R7,#0feh, nomack
        mov     a,#00h
        call    send_motopc             ;SEND id TO PC
        mov     a,#00h
        call    send_motopc             ;SEND id TO PC
        mov     a,#00h
        call    send_motopc             ;SEND id TO PC
nomack:
        ljmp    SRVC_PCDAT_R
send_motopc:
        call    SENDAUX_DATA            ;SEND ack TO PC
        mov     DPTR,#regPC_STAT
wait4mack:
        movx    a,@DPTR
        jb      acc.bitPCS _BF,wait4mack; Clear output buffer
        ret
;*************************************************
;External mouse processing
;*************************************************
real mouse:
        %CHECK_TRANSMIT(AXD)            ;is aux enabled?
        jno     spdo00                  ;no, don't send
        mov     a,R7                    ;set up transmission byte
        cjne    R7,#0ffh,noff
        mov     R0,#bSMIS
        mov     a,@R0
        setb    acc.bitFF_IP
        mov     @R0,a
        mov     a,R7
noff:
        lcall   SEND_TO_AUXDEV
        jc      spdo00                  ;transmission error occurred
        %SET_MASK(bAXDstate,maskAXack);receive acknowledge
spdo00:ljmp     SRVC_PCDAT_R
SENDAUX_DATA:
;;;;;f.a. - 9/11/92
;*************************************************
;While password is enabled, only pass solicited mouse reports
;to PC
        mov     R3,a
        mov     a,bGEN_INFO             ;If password
                                         enabled
        jnb     acc.bitPASS_ENABLE,send_mouse_byte
;*********************************************
        mov     a,bMISCFLG
        jb      acc.bitKEYBOMsend_mouse_byte
;*********************************************
        mov     R0,#MOUSE_PASSWORD_CONTROL
        mov     a,@R0
        jz      snaex0                  ;Do not send unsolicited
                                         reports to PC.
        dec     a
        mov     @R0,a
send_mouse_byte:
        mov     a,R3
;*********************************************
;;;;;;;
        mov     R3,a
        mov     a,bCCB42
        mov     c,acc.bitINTR_AUX       ;(1) generate interrupt?
        mov     DPTR,#CONF_R0
        movx    a,@DPTR                 ;disable interrupt . . .
        mov     acc.5,c                 ;enable/disable AUX1
        movx    @DPTR,a
        mov     DPTR,#regPC_STAT        ;sending from aux
        movx    a,@DPTR
        setb    acc.bitPCS_AUXOBF
        movx    @DPTR,a
        mov     DPTR,#regpc_AUX1        ;send thru AUX1 interrupt
        mov     a,R3
        movx    @DPTR,a
snaex0:ret
```

What is claimed is:

1. A method of operating a computer system of the type having a CPU, system memory associated with said CPU, a keyboard, a keyboard controller connected to said keyboard and to said CPU, and local keyboard controller memory associated with said keyboard controller, said method comprising the steps:

switching said CPU into a password lock mode in which unsolicited data or requests from peripheral devices other than said keyboard are not accepted by said CPU until a predetermined sequence is entered on said keyboard;

switching said keyboard controller between a normal operating mode and a peripheral-emulation mode, wherein said keyboard controller emulates a connection between the computer system and at least one peripheral device not connected to the computer system, by storing and responding to initialization data and commands sent by the CPU to initialize said peripheral device, in place of said peripheral device;

receiving initialization data and commands, by said keyboard controller, addressed from the CPU to said at least one peripheral device;

transmitting a response to said initialization data and commands, from said keyboard controller to the CPU;

storing said initialization data and commands in memory;

connecting said at least one peripheral device to said computer system; and transmitting said stored initialization data and commands to said at least one peripheral device.

2. A method according to claim 1, wherein said keyboard controller transmits said stored data and commands to said peripheral device when said keyboard controller switches out of said peripheral-emulation mode.

3. A method according to claim 1, wherein said keyboard controller transmits said stored data and commands to said peripheral device when said peripheral device is connected to said computer system.

* * * * *